US007928733B2

(12) United States Patent
Gorek et al.

(10) Patent No.: US 7,928,733 B2
(45) Date of Patent: Apr. 19, 2011

(54) CONCENTRIC BUTTONS OF DIFFERENT SIZES FOR IMAGING AND STANDOFF CORRECTION

(75) Inventors: Matthias Gorek, Lower Saxony (DE); Gregory B. Itskovich, Houston, TX (US); Alexandre N. Bespalov, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 447 days.

(21) Appl. No.: 12/178,590

(22) Filed: Jul. 23, 2008

(65) Prior Publication Data
US 2010/0019772 A1    Jan. 28, 2010

(51) Int. Cl.
*G01V 3/06* (2006.01)
*G01V 3/08* (2006.01)
*G01V 3/12* (2006.01)

(52) U.S. Cl. .......................... 324/364; 324/357; 324/363
(58) Field of Classification Search .................. 324/347, 324/348, 351, 354, 355, 356, 357, 358, 360, 324/363, 364, 366, 367, 368, 369, 370, 372, 324/374
See application file for complete search history.

(56) References Cited

U.S. PATENT DOCUMENTS

| 6,359,438 | B1  |   | 3/2002 | Bittar |
| 6,600,321 | B2  |   | 7/2003 | Evans |
| 6,714,014 | B2  |   | 3/2004 | Evans et al. |
| 7,046,010 | B2  | * | 5/2006 | Hu et al. ........................ 324/367 |
| 7,250,768 | B2  |   | 7/2007 | Ritter et al. |
| 7,256,582 | B2  | * | 8/2007 | Gorek et al. .................. 324/373 |

OTHER PUBLICATIONS

Randy Gold, et al. "Multi-Resolution Borehole Resistivity Imagining". U.S. Appl. No. 12/178,306, filed Jul. 23, 2008.
Bittar, et al. "A Muliple-Depth-of-Investigation Electromagnetic Wave Resistivity Sensor: Theory, Experiment, and Field Test Results". SPE 22705. Sep. 1993. pp. 171-176.

* cited by examiner

*Primary Examiner* — Kenneth J Whittington
(74) *Attorney, Agent, or Firm* — Cantor Colburn LLP

(57) ABSTRACT

A method of estimating standoff in a borehole through an earth formation, includes: disposing a sensor including a plurality of return electrodes and at least one transmitter electrode disposed in a concentric arrangement into the borehole; injecting current, I, into the formation by applying at least two frequencies of alternating current (AC) voltage between at least two of the electrodes; measuring impedance, Z, for each of the frequencies; and using a predetermined relationship between impedance, Z, and standoff, estimating the standoff. A system and a computer program product are provided.

19 Claims, 6 Drawing Sheets

CONCENTRIC BUTTONS OF DIFFERENT SIZES FOR IMAGING AND STANDOFF CORRECTION

BACKGROUND OF THE INVENTION

1. Field of the Invention

The invention disclosed herein relates to imaging of subsurface materials and, in particular, to embodiments of electrodes useful for resistivity imaging.

2. Description of the Related Art

Drilling apparatus used for geophysical exploration often include sensors for collecting information about ambient subsurface materials. Sensors may include ones such as those used for resistivity imaging. However, certain problems arise in the use of sensors in a drill string. For example, conventional corrections are performed with calipers and other devices measuring the distance (mechanical, acoustic etc.). The main problem here is the different position of resistivity sensor and caliper, which makes the correction procedure doubtful if vibration occurs.

Therefore, what is needed is a design which offers accurate measurements of standoff at the same position as the resistivity measurements when performing measurement while drilling.

BRIEF SUMMARY OF THE INVENTION

Disclosed is a method of estimating standoff in a borehole through an earth formation, the method including: disposing a sensor including a plurality of return electrodes and at least one transmitter electrode disposed in a concentric arrangement into the borehole; injecting current, I, into the formation by applying at least two frequencies of alternating current (AC) voltage between the plurality of return electrodes and the at least one transmitter electrode; measuring impedance, Z, for each of the frequencies; and using a predetermined relationship between impedance, Z, and standoff, estimating the standoff.

Also disclosed is a system for correcting imaging of an earth formation, the system including: a sensor including a plurality of return electrodes and at least one transmitter electrode disposed in a concentric arrangement into the borehole; a processor coupled to the sensor and a power supply, the processor including machine executable instructions stored therein for imaging the formation by: injecting current, I, into the formation by applying at least two frequencies of alternating current (AC) voltage between the plurality of return electrodes and the at least one transmitter electrode; measuring effective impedance, $Z_e$, for each of the frequencies; using a predetermined relationship between standoff and at least one of impedance, Z, and a geometric factor, G, estimating the standoff, S; and correcting the imaging according to the standoff, S.

Further disclosed is a computer program product including machine readable instructions stored on machine readable media, the instructions for imaging an earth formation using a sensor including a plurality of return electrodes and at least one transmitter electrode disposed in a concentric arrangement, by implementing instructions for: injecting current, I, into the formation by applying at least two frequencies of alternating current (AC) voltage between the plurality of return electrodes and the at least one transmitter electrode; measuring effective impedance, $Z_e$, for each of the frequencies; using a predetermined relationship between standoff and at least one of impedance, Z, and a geometric factor, G, estimating the standoff, S; and correcting the imaging according to the standoff, S.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Disclosed are techniques for using a sensor having a plurality of electrodes arranged in a concentric manner. The techniques provide for collection of data in challenging environments, such as downhole environments that include oil-based-mud. For a better appreciation of the teachings herein, and a context of the invention, consider the following aspects provided with regard to FIGS. 1 and 2.

Figure 1:
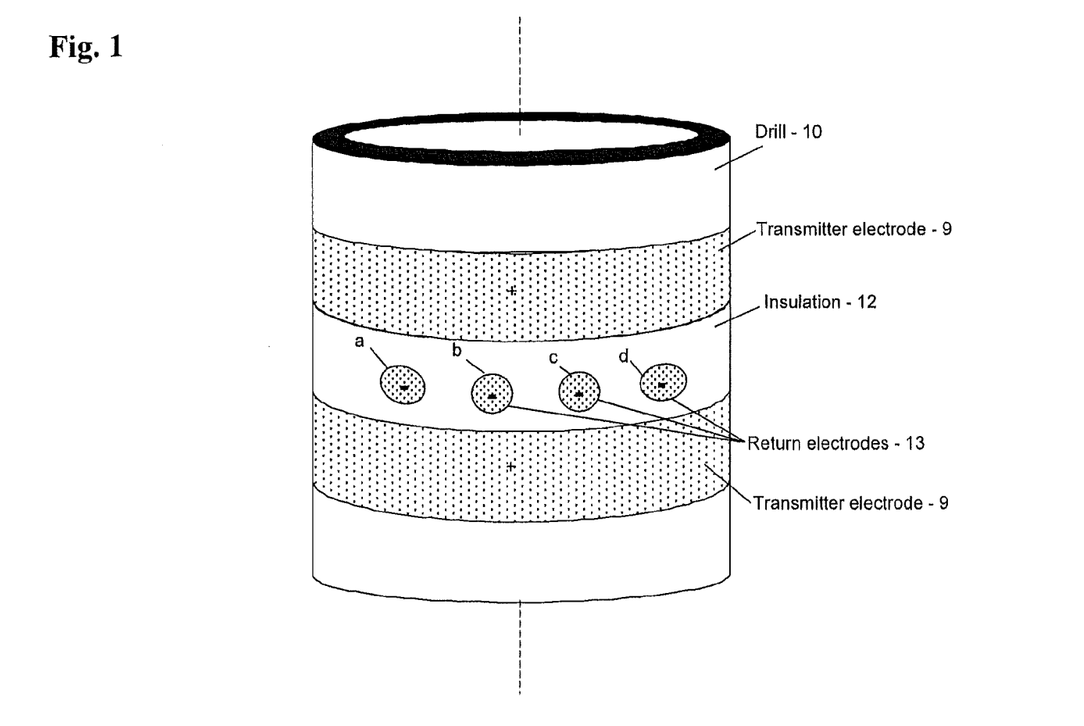
FIG. 1 depicts a sensor having a circumferential distribution of return electrodes along a drill.
Figure 2:
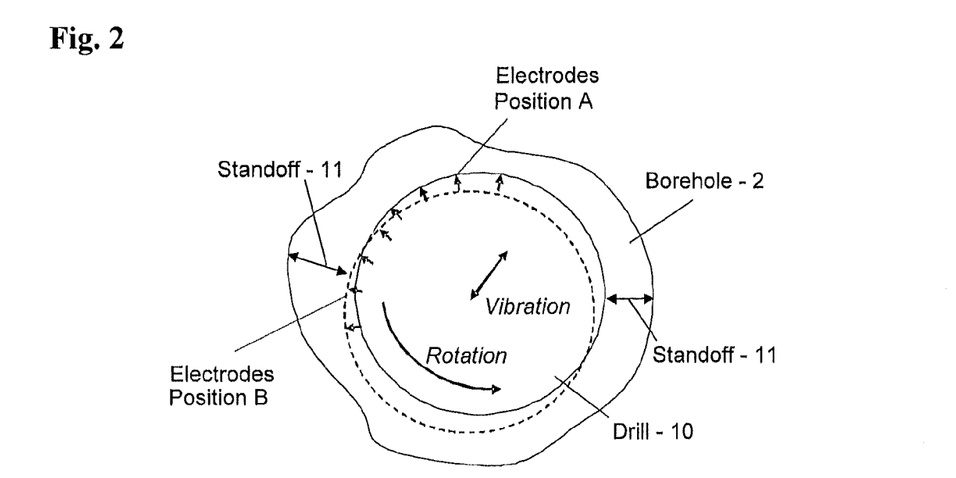
FIG. 2 depicts effects of vibration and rotation of the drill on positioning of the sensor shown in FIG. 1.

FIG. 1 illustrates an arrangement of a sensor with four button electrodes (also referred to as "return electrodes 13"). The return electrodes 13 may be used for a variety of measurements, including those assessing a standoff distance, or simply "standoff 11." Standoff 11 as discussed herein is a distance from an outer surface of a drill 10 (or other such equipment) to a wall of a borehole 2. As shown in FIG. 2, standoff 11 can vary as the borehole 2 typically does not include regular surfaces.

The return electrodes 5 depicted are in four related yet slightly different locations (shown as sensor electrodes "a," "b," "c," and "d"). The use of such sensor electrodes provides for certain advantages when performing measurements and evaluating results. However, due to different positioning of each return electrode 13 on the drill 10, each return electrode 13 measures a property of the borehole 2 at a different position. Therefore, assessment of standoff 11 with one return electrode 13 will not be based on the same information as used by another return electrode 13.

Using such an arrangement of return electrodes 13, it is not possible to uniformly apply the standoff correction. More specifically, measurement values have to be stored and an algorithm has to be applied. Usually, this takes place after one complete rotation. Further, and by way of example, due to vibration (frequency could be some Hz) the different electrodes have different distances by passing the same position. In this case, the correction applied for this position later would be wrong. This problem is more or less the same like for FIG. 3.

Figure 3:
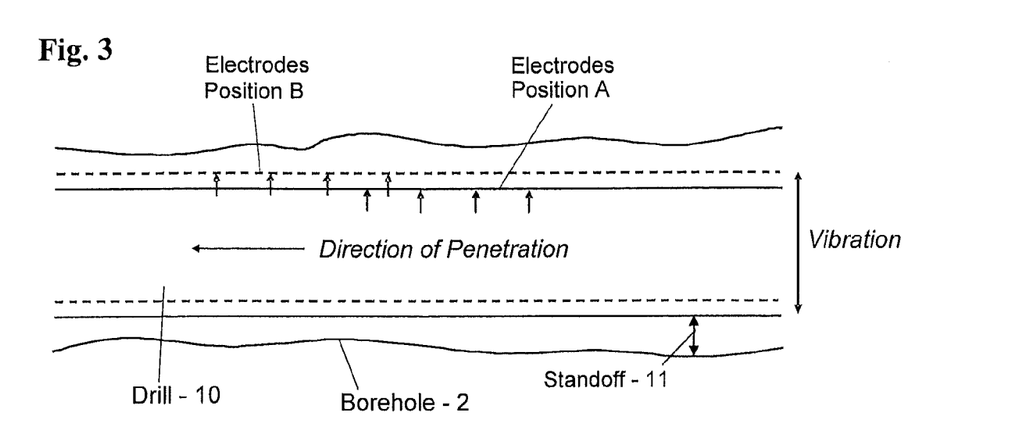
FIG. 3 depicts a sensor having an axial distribution of return electrodes along a drill.

Another orientation, such as one shown in FIG. 3, where the buttons (i.e., return electrodes 13) may be positioned in vertical direction along the drill string 10, is also problematic. In this embodiment, problems arise because the time delay depends on the rate of penetration and is therefore larger. Variation in standoff 11 arises due to vibration of the drill 10 and irregular shape of the borehole 2, and is further complicated by a requirement to consider a rate of penetration. Because of vibration and longer time delay, it is not very likely that one sensor electrode will monitor the same location as another sensor electrode. Depending on distances between each of the sensor electrodes, the time delay may be long enough that the borehole shape may even slightly change.

Figure 4:
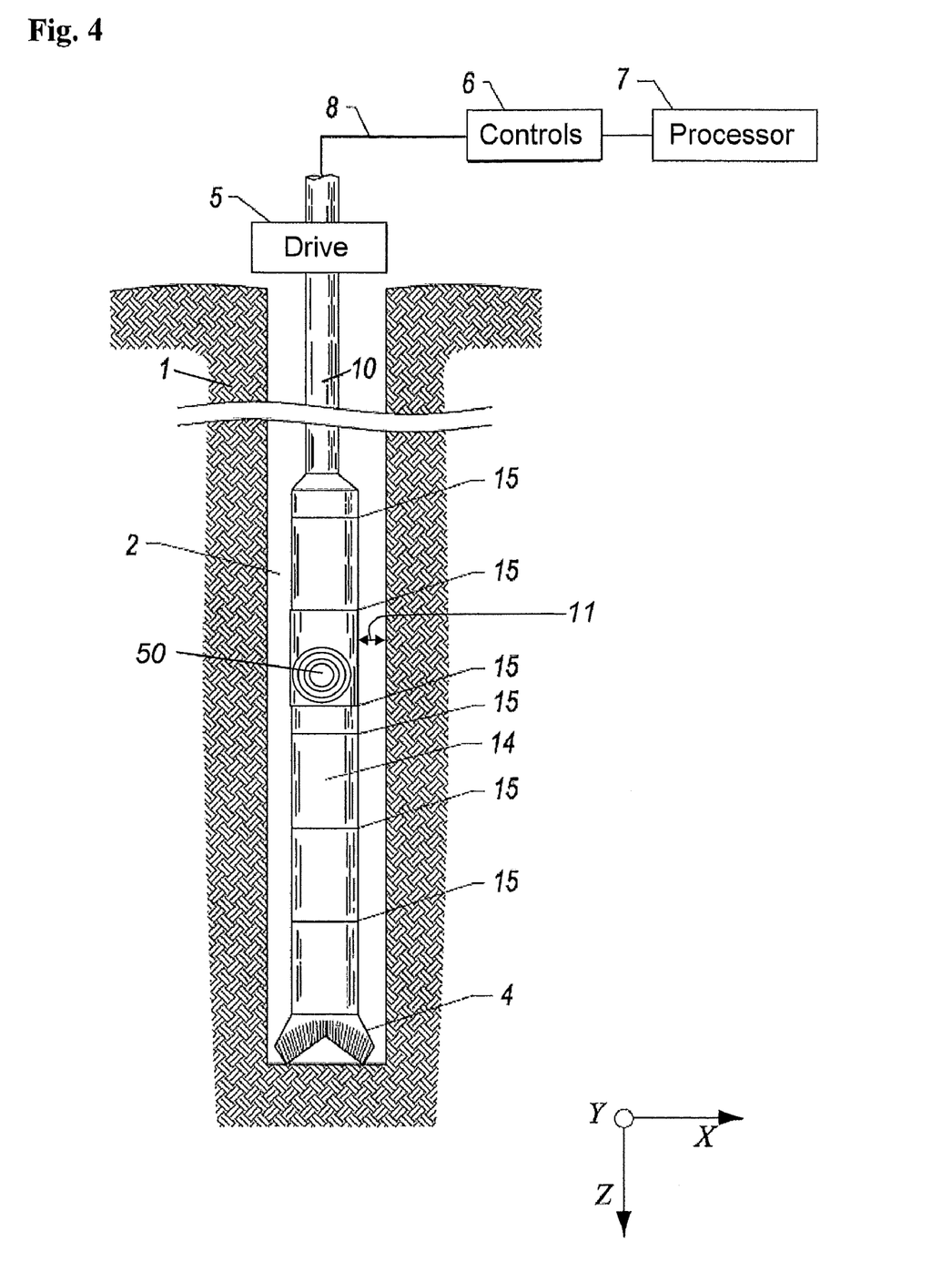
FIG. 4 depicts aspects of an apparatus for conducting logging while drilling.

Referring now to FIG. 4, there are shown aspects of an exemplary embodiment of an instrument 50 for conducting "logging-while-drilling" (LWD). The instrument 50 is included within a drill string 10 that includes a drill bit 4. The drill string 10 provides for drilling of a borehole 2 into earth formations 1. The drill bit 4 is attached to a drill collar 14. The drill string 10 may include a plurality of couplings 15 for coupling various components into the drill string 10.

Generally, the borehole 2 is filled with drilling mud. Drilling mud may be introduced for a variety of reasons, including provision of a pressure barrier. In some instances, it is advantageous to use oil-based-mud as the drilling mud. The instrument 50 disclosed herein is particularly useful in the presence of oil-based-mud (OBM).

As a matter of convention herein and for purposes of illustration only, the instrument 50 is shown as traveling along a Z-axis, while a cross section of the instrument 50 is realized along an X-axis and a Y-axis.

In some embodiments, a drive 5 is included and provides for rotating the drill string 10 and may include apparatus for providing depth control. Control of the drive 5 and the instrument 50 is achieved by operation of controls 6 and a processor 7 coupled to the drill string 10. The controls 6 and the processor 7 may provide for further capabilities. For example, the controls 6 are used to power and operate sensors (such as antenna) of the instrument 50, while the processor 7 receives and at least one of packages, transmits and analyzes data provided by the drill string 10 and/or components therein. In various embodiments of instruments for logging while drilling (LWD), the instrument 50 processes at least some of the data collected downhole.

Figure 5:
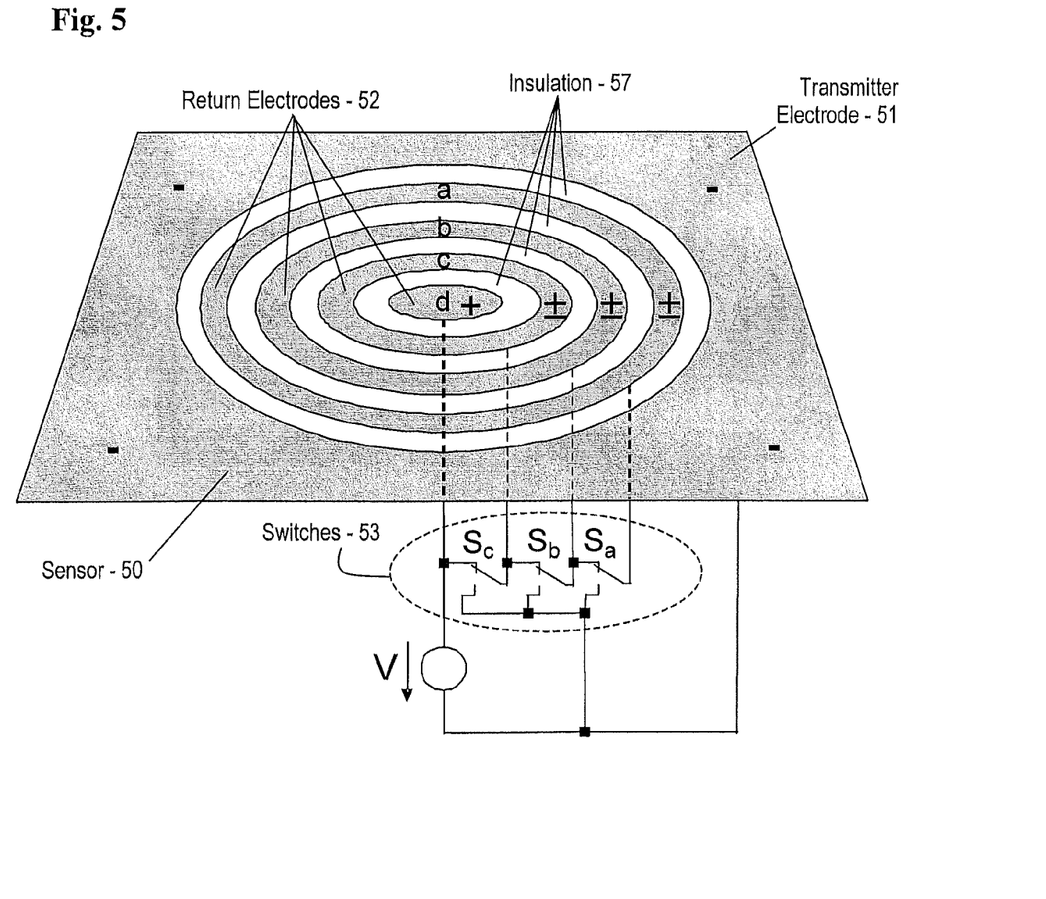
FIG. 5 depicts a sensor according to the teachings herein.

Considering the instrument 50 now in greater detail, and also with reference to FIG. 5, in this embodiment, the instrument 50 includes a plurality of electrodes, and is referred to in the following discussion as a "sensor 50." For convention, the electrodes of the sensor 50 include at least one transmitter electrode 51 and a plurality of return electrodes 52. Each of the electrodes is separated from the other electrodes by an insulator 57. At least one sensor 50 may be disposed on an outer surface of the drill string 10 as deemed appropriate.

Generally, the sensor 50 includes a plurality of switches 53. The switches 53 provide for controlling application of voltage to each of the electrodes. In short, each of the switches 53 may be toggled to provide for various arrangements of "firing" or energizing of each electrode. The voltage provided to each electrode may be of any frequency deemed appropriate, in any duration deemed appropriate, and in any combination as deemed appropriate. By controlling arrangement of the switches 53, an apparent size of the return electrode 52 can be modified. Thus, not only is the size of the return electrode modified, but if a ring is switched to opposite polarity, also the size of the transmitter electrode is changed.

Generally, a power supply for the sensor 50 provides alternating current (AC) that is in a relatively high frequency, f, range (for example, of about 1 MHz to about 10 MHz). The sensor 50 may be operated at frequencies, f above or below this range. For example, the sensor 50 may be operated in frequency ranges from about 100 kHz to 100 MHz.

In some embodiments, the return electrodes 52 are referred to as "sensor electrodes" and in other embodiments may be referred to as "button electrodes," or simply as a "button." In operation, the transmitter electrode 51 provides for one pole of an electric dipole, while the at least one return electrode 52 provides for the other pole. Accordingly, the sensor 50 makes use of a single electric dipole for electric imaging, generally at a high-frequency, f Thus, it should be recognized that the terms "transmit" and "return" and the various forms of these terms are merely illustrative of aspects of operation of the instrument 50, particularly for embodiments using AC current, and are therefore not to be construed as limiting of the instrument 50.

In some embodiments, achieving different button sizes at one location is accomplished by changing polarity of electrode rings for the return electrodes 52. That is, the switches may be arranged so that inner electrode rings are dominating the outer rings or the other around. More specifically, only if the inner ring (c) has the same polarity as the button in the center (d), the polarity of the next outer ring (b) can be switched to the polarity of the inner electrodes, etc. In this way, one can guarantee that no alternating polarities are selectable. Of course, one should recognize that an apparent size of the transmitter electrode may be altered. For example, the outer return electrode (a) may be set to a polarity of the transmitter electrode 51. Other combinations may be had.

Generally, the AC voltage source between the return electrode(s) 52 and transmitter electrode 51 is applied to provide sufficient conditions for injecting current, I, into the formation 1. During the operation, the electrodes are generally maintained under an equivalent electrical potential. An output of the sensor 50 includes impedance measured between each return electrode 52 and the transmitter electrode 51. Generally, the sensor 50 is mounted on an outer surface of the drill 10 and results in 360 degree coverage for imaging of the formation 1.

Although it is considered that the sensor 50 is generally operated with supporting components as shown (i.e., the controls 6 and the processor 7), one skilled in the art will recognize that this is merely illustrative and not limiting. For example, in some embodiments, the sensor 50 may include at least one on-board processor 7.

Turning now to the invention in greater detail, in one embodiment (see FIG. 5), a series of the measurement return electrodes 52 (denoted as "a," "b," "c," and "d") are placed on a single circumferential pad attached to the drill 10. The return electrodes 52 of different sizes are separated by isolative gaps, each gap including an insulator 57. The source voltage of high frequency (generally of 1 MHz or above) is applied between the transmitter electrode(s) 51 and the return electrode(s) 52. Generally, all of the return electrodes 52 are kept under the same electrical potential driven by the applied voltage, V. Generally, the measured value is the complex impedance, Z, through each return electrode 52, or combination of return electrodes 52. This arrangement provides capacitive coupling between the sensor 50 and the formation 1 and enables imaging of the formation 1 even in the conditions of a very resistive oil-based mud.

Using the sensor 50 as described above, users are effectively provided with a sensor of varying sizes. This provides users with an ability to, among other things, estimate a dimension of the standoff 11 (the dimension being useful for correcting data collected from the formation 1) and also to maintain a desired resolution during imaging (under conditions of variable standoff).

Equation (1) below provides a relationship where estimates of standoff 11 may be determined. That is, by performing measurements with return electrodes 52 of different sizes and by applying Eq. (1), standoff 11 may be estimated.

$$G \cdot Re(\dot{Z}) = R_f \quad (1);$$

In Eq. (1), Re($\dot{Z}$) represents a real part of measured impedance, $R_f$, represents a resistivity of the formation, and G represents a geometric factor.

Figure 6:
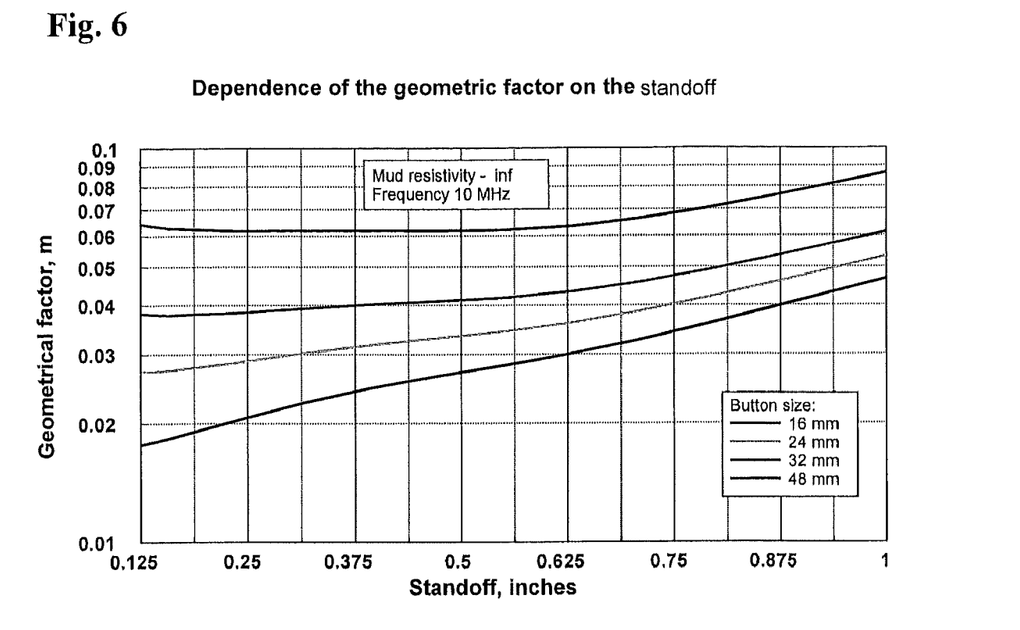
FIG. 6 is a graph depicting dependence of a geometric factor on standoff.

It turns out that even in the presence of highly resistive drilling mud, the geometric factor, G, changes with the standoff 11. The change becomes more pronounced for the more pronounced standoff and a smaller effective return electrode 52. This effect is illustrated in FIG. 6 where mathematical modeling results of the geometric factor, G, are presented. In this example, the results correspond to sizes of 16 millimeters (mm), 24 mm, 32 mm and 48 mm. The operating frequency in this example was 10 MHz, the distance from the center of the return electrode to the transmitter electrode was 96 mm. The resistivity, $R_f$, (assuming a homogeneous formation) was 10 ohm-meters. As this figure shows, the geometric factor, G, of a large 48 mm return electrode 52 does not depend on the standoff 11, if the standoff 11 is less than about 1.5875 centimeters (cm, or about 0.625 inches). For return electrodes 52 of 16 mm and 32 mm, the geometric factor, G, depends on the standoff 11 in the whole analyzed range of standoffs. If corrections are not made for this effect, the readings from small return electrodes 52 will produce an inaccurate image. Accordingly, using an imaginary part of the impedance for the corrections may address the inaccuracy.

Figure 7:
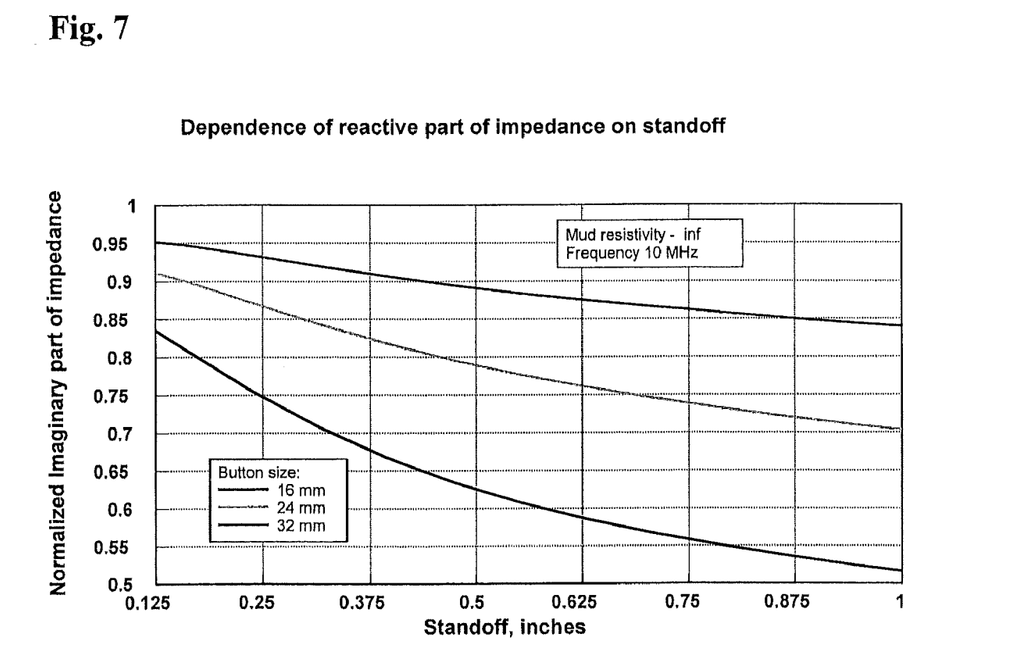
FIG. 7 is a graph depicting dependence of a reactive part of the impedance on standoff, where the curves are normalized to the largest return electrode.

As shown in FIG. 7, the normalized imaginary part of the impedance depends differently on the standoff That is, there is a small difference between impedances where standoff is about 0.3175 cm (0.125 inches), while there is a significant difference between impedances at about 1.27 cm (about 0.5 in). To quantify behavior of the imaginary part of the impedance for the different size electrodes, the curves of FIG. 7 may be divided by the curve corresponding to 48 mm size return electrode. The result of the division is presented in FIG. 8 and represents a chart that is used for the standoff estimation. In order to perform the correction, a ratio between readings corresponding to an individual return electrode and the 48 mm return electrode 52 should be calculated. Then, for a given size of the return electrode (as shown in FIG. 7) and calculated ratio (provided along the y-axis of FIG. 7) the resulting graph enables finding of a standoff value (shown along the x-axis). As soon as the standoff 11 is known, the correction chart, such as the exemplary one provided in FIG. 6, may be used to find the geometric factor, G, corresponding to the given size of return electrode 52 and standoff 11.

In this process, a selection of readings that maintain acceptable vertical resolution under the conditions of variable standoff may be made. In other words, under certain standoff conditions, readings from the small return electrodes 52 become non-recoverable. Even after being corrected for standoff, the readings cannot deliver an image of the formation 1. Under such circumstances, readings corresponding to the return electrode 52 which is less affected by the standoff may be selected over readings from the smaller return electrodes 52. These readings are generally capable of providing an image of the formation 1. Modeling results demonstrate that an acceptable quality image is obtained when the size B return electrode 52 is at least three times bigger than the standoff Using this criterion, readings that provide the best image for the given (estimated) standoff may be adaptively selected. Under conditions of a rugose borehole, this selection is similar to a low-pass filter, which filters out high frequency component from the data. This effect is illustrated in FIG. 8.

Figure 8:
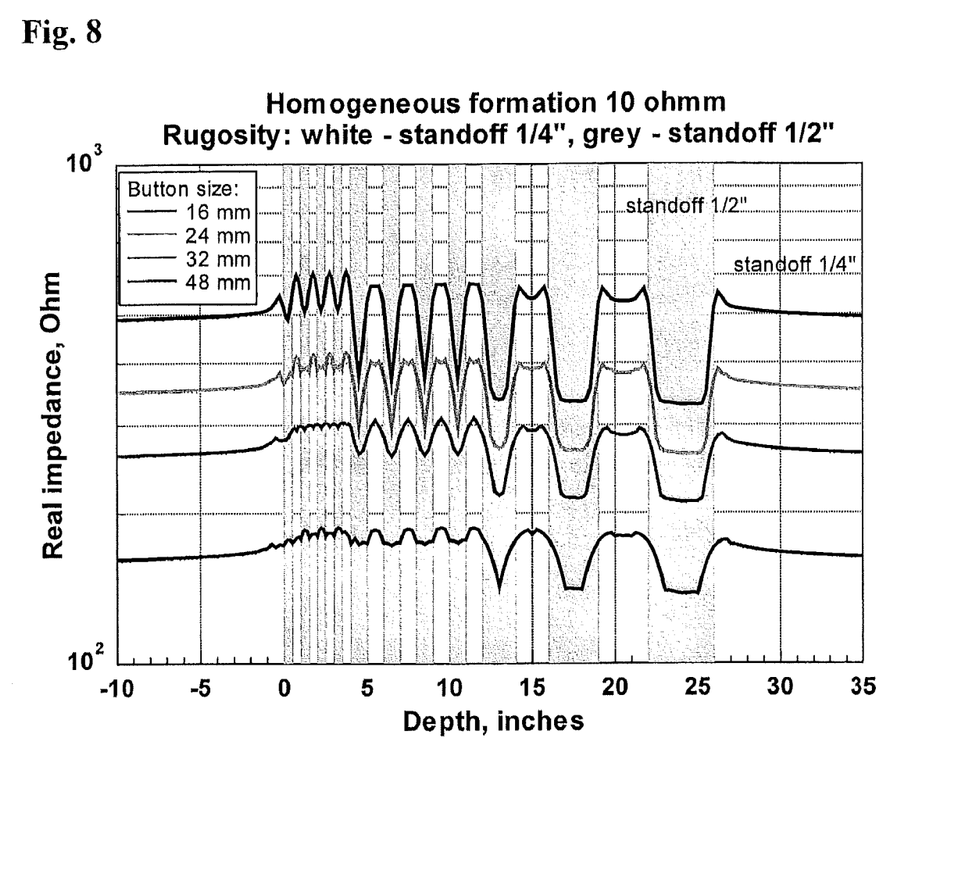
FIG. 8 is a circuit diagram effectively depicting aspects of standoff dependence for the sensor.

In FIG. 8, results of mathematical modeling are presented for different sizes of the return electrodes 52. These results are provided for a homogeneous formation 1 and a rugose borehole. In this example, rugosity is simulated by changing the size of the borehole such that the standoff is periodically changing from 0.25 to 0.5 in. The width of the standoff varies from about 0.5 inches to about 4 inches. As shown in FIG. 8, the smaller the return electrodes, the bigger the effect of borehole irregularities on the readings. The opposite is true as well. That is, effectiveness of suppression of false readings is increased with bigger return electrodes 52.

In the examples of FIGS. 6 and 7, the results were obtained under the assumption that resistivity of the oil-based mud, $R_{obm}$, is about five or more orders of magnitude bigger than the resistivity of formation, $R_f$. Although this assumption is generally valid for the vast majority of practical cases, there are some borehole fluids that are less resistive relatively to the formation. In this case, an additional step that includes correction for resistivity of the mud, $R_m$, should be performed. This correction may be based a technique such as the one provided below. Correction for the finite resistivity of the mud should be performed at the first stage of the processing prior to the geometric factor correction.

Figure 9:
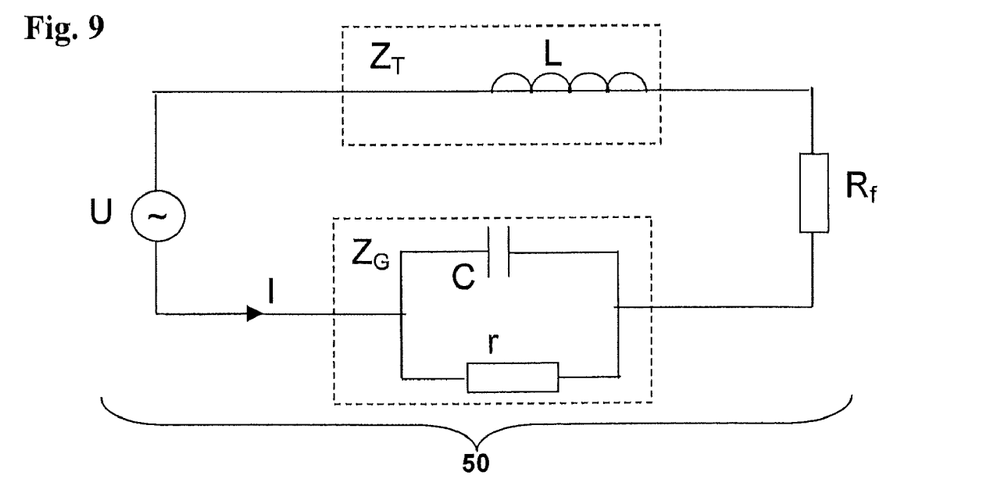
FIG. 9 is a chart useful for estimating standoff as a function of real impedance.

As an example of correction for less resistive mud, consider the effective schematic circuit diagram presented in FIG. 9. The circuit provided may be equated to aspects of the electric function of the sensor 50. This example shows that the measured effective impedance, $Z_e$, depends on the internal impedance of the tool, $Z_T$, the impedance due to the gap between the sensor and the formation, $Z_G$, and the formation resistivity, $R_f$. For simplicity, it is assumed that there is no gap between the return electrode 52 and the formation 1. For applied voltage, U, and measured current, I, then the effective impedance, $Z_e$, is estimated by Eq. (2):

$$Z_e = Z_T + Z_G + R_f = \frac{U}{I} \quad (2)$$

In case of a conductive formation (where resistivity of the formation $R_f \leq 10$ ohm-m) and oil-based mud, the contribution of the formation into the effective impedance, $Z_e$, is small ($R_f \ll Z_T + Z_G$) and it can be expected that a reduction of the sensitivity of the measured impedance to the resistivity of formation, $R_f$. The gap impedance, $Z_G$, which depends on the mud properties and the receiver standoff, becomes a major contributor into the effective impedance, $Z_e$. Note that in Eq. (2), $Z_T$ represents an impedance of the sensor 50. To extract the information about formation resistivity, $R_f$, multi-frequency measurements may be employed prior to data processing. Consider using two frequencies. First, assume that impedance measurements have been conducted using a first frequency, $f_1$ and a second frequency, $f_2$. Each frequency ($f_1$, $f_2$) permits estimation of correlating effective impedances $Z_{e1}$ and $Z_{e2}$. This estimating may be performed according to Eq. (3):

$$Z_{e1} = i\omega_1 L + R_f + \frac{1}{r^{-1} + i\omega_1 C} = A_1 + iB_1, \tag{3}$$

$$Z_{e2} = i\omega_2 L + R_f + \frac{1}{r^{-1} + i\omega_2 C} = A_2 + iB_2$$

where $A_1$, $A_2$ and $B_1$, $B_2$ correspond to the real and imaginary parts of the impedances $Z_{e1}$ and $Z_{e2}$, respectively. Eqs. (3) may be rearranged as provided in Eqs. (4), and Eqs. (5):

$$A_1 - A_2 = r^{-1}\left(\frac{1}{r^{-2} + (\omega_1 C)^2} - \frac{1}{r^{-2} + (\omega_2 C)^2}\right), \tag{4}$$

$$\frac{B_1}{\omega_1} - \frac{B_2}{\omega_2} = -C\left(\frac{1}{r^{-2} + (\omega_1 C)^2} - \frac{1}{r^{-2} + (\omega_2 C)^2}\right)$$

$$\frac{\frac{B_1}{\omega_1} - \frac{B_2}{\omega_2}}{A_1 - A_2} = G = Cr \tag{5}$$

Combining Eq. (5) with the first equation of Eqs. (4), resistivity of the gap, $R_g$, may be found, as provided in Eq. (6):

$$R_g = (A_1 - A_2)\bigg/\left(\frac{1}{1 + (\omega_1 G)^2} - \frac{1}{1 + (\omega_2 G)^2}\right) \tag{6}$$

Equation (5) allows estimation of capacitance C between the return electrode 52 and the formation 1, while resistivity of formation, $R_f$, may be derived from the Eq. (3), for example, by Eq. (7):

$$R_f = A_1 - \frac{(\omega_1 C)^2 r}{r^2 + (\omega_1 C)^2} = A_2 - \frac{(\omega_2 C)^2 r}{r^2 + (\omega_2 C)^2} \tag{7}$$

Figure 10:
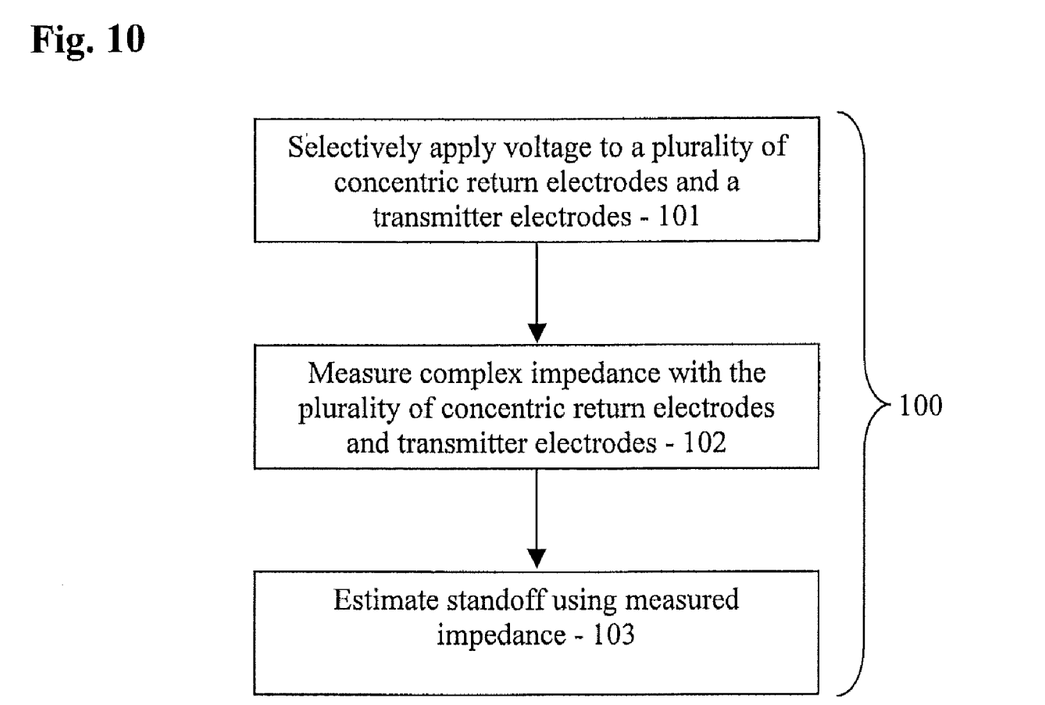
FIG. 10 is a flow chart providing an exemplary method for using the sensor of FIG. 5.

Accordingly, and as depicted in FIG. 10, an exemplary and non-limiting method for estimating standoff 100 calls for selectively applying voltage to a plurality of concentric return electrodes and transmitter electrode 101; measuring the impedance 102; and estimating standoff using the measured impedance 103.

In summary, a method for imaging borehole wall resistivity with 360 degree coverage in the presence of oil-based mud is described. A sensor for the imaging includes a circumferential pad mounted on a drill and containing a series of variable size buttons electrodes (i.e., return electrodes) separated by insulating gaps. That is, a size of the button electrode is determined by a number of ring electrodes having the same polarity. The voltage source between symmetrical transmitting electrodes and sensor buttons is applied to provide sufficient conditions for injecting current into the formation. An output of the sensor comprises a measurement of the complex impedance for each sensor electrode. The set of the buttons of different size provides enough flexibility to adjust imaging for the variable standoff conditions by correcting for the variable standoff and selecting readings the best suitable for the determined standoff The 360 degree coverage is achieved via combination of the pad's shape, pad's azimuthal rotation, and a system to centralize the position of the imager in the well.

In support of the teachings herein, various analysis components may be used, including digital and/or an analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

What is claimed is:

1. A method of estimating a property of an earth formation traversed by a borehole, the method comprising:

disposing into the borehole a sensor comprising a plurality of return electrodes and at least one transmitter electrode disposed in a concentric arrangement;

injecting a first current, $I_1$, of a first frequency, $f_1$, into the formation by applying an alternating current (AC) voltage between first selected ones of the plurality of return electrodes and the at least one transmitter electrode;

injecting a second current, $I_2$, of a first frequency, $f_2$, into the formation by applying an alternating current (AC) voltage between second selected ones of the plurality of return electrodes and the at least one transmitter electrode;

measuring effective impedance, $Z_e$, for each of the currents; and     using a predetermined relationship between at least one of the effective impedance, $Z_e$, and standoff, to estimate the standoff between the sensor and the borehole.

2. The method as in claim 1, wherein the first selected ones and the second selected ones are selected to vary an apparent size of the sensor.

3. The method as in claim 1, further comprising determining a resistivity of a gap, $R_g$, between the sensor and the formation.

4. The method as in claim 1, further comprising determining a resistivity of the formation, $R_f$.

5. The method as in claim 1, further comprising determining a capacitance, C, between the formation and an electrode injecting at least one of the first current, $I_1$, and the second current, $I_2$.

6. The method as in claim 1, further comprising fitting a curve to the effective impedance measurements.

7. The method as in claim 1, further comprising selecting the selected ones to modify an effective size of at least one of the return electrode and the transmitter electrode.

8. The method as in claim 7, wherein the selecting comprises performing switching between the electrodes.

9. The method as in claim 1, further comprising determining a geometric factor, G, for the sensor.

10. The method as in claim 1, further comprising determining an imaginary part of the effective impedance, $Z_e$.

11. The method as in claim 1, wherein the predetermined relationship comprises at least one of a graph, a table of values, and a mathematical function.

12. A system for correcting imaging of an earth formation traversed by a borehole, the system comprising:
a sensor disposed into the borehole, the sensor comprising a plurality of return electrodes and at least one transmitter electrode disposed in a concentric arrangement;
a processor coupled to the sensor and a power supply, the processor comprising machine executable instructions stored therein for imaging the formation by:
injecting a first current, $I_1$, of a first frequency, $f_1$, into the formation by applying an alternating current (AC) voltage between first selected ones of the plurality of return electrodes and the at least one transmitter electrode;
injecting a second current, $I_2$, of a second frequency, $f_2$, into the formation by applying an alternating current (AC) voltage between second selected ones of the plurality of return electrodes and the at least one transmitter electrode;
measuring effective impedance, $Z_e$, for each of the currents;
using a predetermined relationship between standoff and at least one of effective impedance, $Z_e$, and a geometric factor, G, to estimate the standoff, S, between the sensor and the borehole; and
correcting the imaging according to the standoff, S.

13. The system as in claim 12, wherein the geometric factor, G, is estimated according to a relationship comprising:

$$G \cdot Re(\dot{Z}) = R_f;$$

where $Re(\dot{Z})$ represents a real part of measured impedance and $R_f$ represents a resistivity of the formation.

14. The system as in claim 12, wherein effective impedance, $Z_e$, is estimated according to a relationship comprising:

$$Z_e = Z_T + Z_G + R_f = \frac{U}{I};$$

where I represents the current for a selected frequency, U represents the voltage for the selected frequency, $Z_g$ represents an impedance in a gap between the sensor and the formation, $Z_T$ represents an impedance of the sensor; and $R_f$ represents a resistivity of the formation.

15. The system as in claim 12, wherein the geometric factor, G, is estimated according to a relationship comprising:

$$\frac{\frac{B_1}{\omega_1} - \frac{B_2}{\omega_2}}{A_1 - A_2} = G = Cr;$$

where $A_1$, $A_2$ and $B_1$, $B_2$ correspond to a real part of the impedances and an imaginary part of the impedances for the effective impedance at the first frequency, $Z_{e1}$, and the effective impedance at the second frequency, $Z_{e2}$.

16. The system as in claim 12, further comprising estimating a resistivity of the formation, $R_f$, according to a relationship comprising:

$$R_f = A_1 - \frac{(\omega_1 C)^2 r}{r^2 + (\omega_1 C)^2} = A_2 - \frac{(\omega_2 C)^2 r}{r^2 + (\omega_2 C)^2}$$

where $A_1$, $A_2$ correspond to a real part of the impedance for the first frequency and the second frequency, respectively, and C represents capacitance between an electrode and the formation.

17. The system as in claim 12, wherein a resistivity of the gap, $R_g$, may be estimated according to a relationship comprising:

$$R_g = (A_1 - A_2) \Big/ \left( \frac{1}{1 + (\omega_1 G)^2} - \frac{1}{1 + (\omega_2 G)^2} \right)$$

where $A_1$, $A_2$ correspond to a real part of the impedance for the first frequency and the second frequency, respectively.

18. The system as in claim 12, wherein an image of the formation is generated using measurements from electrodes that satisfy the condition B/S is greater than or equal to 3, where B and S denote an effective size of the electrode and a value of the standoff, respectively.

19. A computer program product comprising machine readable instructions stored on machine readable media, the instructions for imaging an earth formation using a sensor comprising a plurality of return electrodes and at least one transmitter electrode disposed in a concentric arrangement, by implementing instructions for:
injecting a first current, $I_1$, of a first frequency, $f_1$, into the formation by applying an alternating current (AC) voltage between first selected ones of the plurality of return electrodes and the at least one transmitter electrode;
injecting a second current, $I_2$, of a second frequency, $f_2$, into the formation by applying an alternating current (AC) voltage between second selected ones of the plurality of return electrodes and the at least one transmitter electrode;
measuring effective impedance, $Z_e$, for each of the currents;
using a predetermined relationship between standoff and at least one of effective impedance, $Z_e$, and a geometric factor, G, estimating the standoff, S; and
correcting the imaging according to the standoff, S.

* * * * *